United States Patent [19]

Bush et al.

[11] Patent Number: 5,416,142
[45] Date of Patent: May 16, 1995

[54] METHOD OF BONDING AND BONDING COMPOSITIONS

[75] Inventors: Charles N. Bush, Bay Village; Paul F. Naton, North Ridgeville, both of Ohio

[73] Assignee: Oatey Company, Cleveland, Ohio

[21] Appl. No.: 246,690

[22] Filed: May 20, 1994

Related U.S. Application Data

[63] Continuation-in-part of Ser. No. 117,391, Sep. 3, 1993, abandoned, which is a continuation-in-part of Ser. No. 94,500, Jul. 20, 1993, Pat. No. 5,384,345, which is a continuation-in-part of Ser. No. 851,852, Mar. 16, 1992, abandoned, which is a continuation-in-part of Ser. No. 809,421, Dec. 17, 1991, abandoned.

[51] Int. Cl.$^6$ .................. B29C 65/54; C08K 5/15; C08K 5/07
[52] U.S. Cl. .................. 524/113; 156/295; 156/306.6; 156/308.2; 156/309.3; 524/360; 524/361; 524/365; 524/493; 524/494; 524/516; 524/527
[58] Field of Search .......... 156/307.5, 308.2, 309.6, 156/310, 306.6, 294, 295, 293, 516, 523, 527; 524/113, 360, 361, 365, 493, 494, 516, 527; 525/217, 218, 327.6, 329.9, 77, 205, 229, 235

[56] References Cited

U.S. PATENT DOCUMENTS

| | | | |
|---|---|---|---|
| 3,230,184 | 1/1966 | Afford | 260/2.5 |
| 3,284,425 | 11/1966 | Schroder et al. | 260/89.5 |
| 3,314,838 | 4/1967 | Ervin | 156/71 |
| 3,365,315 | 1/1968 | Beck et al. | 106/40 |
| 3,418,274 | 12/1968 | Caplan et al. | 524/527 |
| 3,468,834 | 9/1969 | Oda | 260/32.8 |
| 3,554,957 | 1/1971 | Tilburg | 524/113 |
| 3,615,791 | 10/1971 | Thomas et al. | 106/170 |
| 3,726,826 | 4/1973 | Knight | 524/113 |
| 3,765,983 | 10/1973 | Putzier | 156/293 |
| 3,770,547 | 11/1973 | Kelsey | 156/314 |
| 3,811,980 | 5/1974 | Roderhoff | 156/333 |
| 3,846,511 | 11/1974 | Hill, Jr. et al. | 260/880 R |
| 3,873,475 | 3/1975 | Pechacek et al. | 260/2.5 B |
| 3,917,554 | 11/1975 | Inoue et al. | 260/30.4 A |

(List continued on next page.)

FOREIGN PATENT DOCUMENTS

| | | |
|---|---|---|
| 0271296 | 6/1988 | European Pat. Off. . |
| 0370844 | 5/1990 | European Pat. Off. . |
| 0441159 | 8/1991 | European Pat. Off. . |
| 4911931 | of 1974 | Japan . |

(List continued on next page.)

OTHER PUBLICATIONS

European Search Report–92121451.6 (EP 92121451).
Derwent–89–361991, Cited in European Search Report on EP–92121451.6.
"Adhesive Technology", Arthur H. Landrock, Noyes Publications, Park Ridge, N.J., (1985) pp. 225–236.
Naton, "Understanding Solvent Welding", The North Dakota Mechanical Contractor, First Quarter, 1991, pp. 23–24.

(List continued on next page.)

*Primary Examiner*—Veronica P. Hoke
*Attorney, Agent, or Firm*—Renner, Otto, Boisselle & Sklar

[57] ABSTRACT

A method of adhesively bonding or welding a first plastic surface to a second plastic surface is described which comprises the steps of:

(I) applying to the first surface or second surface or both surfaces, a composition which is free of hollow microspheres and comprises a mixture of
   (A) from about 5% to about 60% by weight of at least one water-insoluble polymer selected from ABS, PVC, CPVC or mixtures thereof;
   (B) from about 1% to about 60% by weight of at least one water-insoluble polymer selected from acrylic polymers, vinyl aromatic polymers and vinylpyrrolidone polymers; and
   (C) from about 10% up to about 90% by weight of at least one volatile organic liquid which is a solvent for polymers (A) and (B);
(II) contacting the first surface with the second surface; and
(III) allowing the adhesive composition to form a bond or weld between the first surface and the second surface.

The invention also relates to compositions which comprise a mixture of components (A) through (C) as defined above.

46 Claims, No Drawings

U.S. PATENT DOCUMENTS

| | | | |
|---|---|---|---|
| 3,926,895 | 12/1975 | Britain et al. | 524/113 |
| 3,936,341 | 2/1976 | Nanoux | 156/333 |
| 4,053,448 | 10/1977 | Halle | 260/40 R |
| 4,089,726 | 5/1978 | Ishii et al. | 156/306 |
| 4,098,719 | 7/1978 | Hushebeck | 282/364 |
| 4,223,067 | 9/1980 | Levens | 428/308 |
| 4,246,374 | 1/1981 | Kopchik | 525/329 |
| 4,255,322 | 3/1981 | Kapchik | 525/205 |
| 4,307,142 | 12/1981 | Blitstein | 428/143 |
| 4,309,334 | 1/1982 | Valitsky | 260/42.15 |
| 4,360,120 | 11/1982 | Samuel et al. | 524/494 |
| 4,374,874 | 2/1983 | Blitstein et al. | 427/379 |
| 4,388,424 | 6/1983 | Kennell et al. | 523/219 |
| 4,403,948 | 9/1983 | Blitstein et al. | 523/218 |
| 4,412,012 | 10/1983 | Bonley et al. | 521/54 |
| 4,415,706 | 11/1983 | Staas | 525/183 |
| 4,455,331 | 6/1984 | Barsotti | 524/516 |
| 4,492,732 | 1/1985 | Murphy et al. | 428/404 |
| 4,596,848 | 6/1986 | Speer | 524/365 |
| 4,634,724 | 1/1987 | Harvey et al. | 523/219 |
| 4,650,824 | 3/1987 | Clikeman et al. | 525/205 |
| 4,672,084 | 6/1987 | Dierdorf et al. | 524/113 |
| 4,675,354 | 6/1987 | Sperling | 524/99 |
| 4,687,798 | 8/1987 | King, Sr. | 524/100 |
| 4,692,480 | 9/1987 | Takahashi et al. | 523/218 |
| 4,727,117 | 2/1988 | Abberton et al. | 525/343 |
| 4,735,837 | 4/1988 | Miyasaka et al. | 428/40 |
| 4,788,002 | 11/1988 | King, Sr. | 252/364 |
| 4,849,466 | 7/1989 | Michaelis | 524/105 |
| 4,980,383 | 12/1990 | Shimazu et al. | 521/85 |
| 5,004,777 | 4/1991 | Abberton et al. | 524/433 |
| 5,004,783 | 4/1991 | Peicec et al. | 525/77 |
| 5,010,120 | 4/1991 | Sugiura | 523/219 |
| 5,028,456 | 7/1991 | Naton | 427/142 |
| 5,047,451 | 9/1991 | Barrett et al. | 523/442 |
| 5,064,868 | 11/1991 | Simpson et al. | 521/54 |
| 5,073,615 | 12/1991 | Shen | 526/262 |
| 5,096,968 | 3/1992 | Iasaki et al. | 525/142 |
| 5,120,769 | 6/1992 | Dyksterhouse et al. | 521/54 |
| 5,157,076 | 10/1992 | Greenlee et al. | 525/83 |
| 5,159,058 | 10/1992 | Jerman et al. | 528/495 |
| 5,208,083 | 5/1993 | Freed | 428/36.7 |
| 5,252,632 | 10/1993 | Savin | 523/137 |
| 5,252,634 | 10/1993 | Patel et al. | 523/218 |

FOREIGN PATENT DOCUMENTS

| | | |
|---|---|---|
| 53-88042 | 6/1978 | Japan . |
| 54-111543 | 8/1979 | Japan . |
| 59-187067 | 10/1984 | Japan . |
| 806936 | 1/1959 | United Kingdom . |

OTHER PUBLICATIONS

Paraloid HT-510 Modifier, Rohm & Haas, "The First Imide-Based Heat Distortion Modifier for Vinyl."

Paraloid KM-334, Rohm & Haas, "Vinyl Performance Additives".

Paraloid KM-390, Rohm & Haas, "The Modifier for the '90s".

"Scotchlite Glass Bubbles, Engineered Fillers for Industry", 3M Co.

"Scotchlite Glass Bubbler, General Purpose Series", 3M Co.

ASTM D2235-88.

ASTM D2369-87.

ASTM D2564-88.

ASTM D2855-83.

ASTM F493-88.

"The Acrylic With High Heat Performance", ICI Acrylics, Sep. 1993.

METHOD OF BONDING AND BONDING COMPOSITIONS

CROSS-REFERENCE TO RELATED APPLICATIONS

This application is a continuation-in-part of application Ser. No. 08/117,391, filed Sep. 3, 1993, abandoned which is a continuation-in-part of application Ser. No. 08/094,500, filed Jul. 20, 1993, U.S. Pat. No. 5,384,345 which is a continuation-in-part of application Ser. No. 07/851,852, filed Mar. 16, 1992, abandoned, which is a continuation-in-part of application Ser. No. 07/809,421, filed Dec. 17, 1991, now abandoned. The disclosures of these prior applications are hereby incorporated by reference in this application in their entirety.

TECHNICAL FIELD

This invention relates to a method for adhesively bonding or welding plastic surfaces and to compositions which comprise mixtures of water-insoluble polymers and a solvent. This invention also relates to adhesive and sealant compositions, and in particular, to adhesive compositions useful for forming a bond or weld between two polymeric surfaces.

BACKGROUND OF THE INVENTION

Adhesives, often referred to as cements, glues or pastes are defined generally as substances capable of holding materials together by surface attachment. Adhesives may attach to surfaces and develop the internal or cohesive strength necessary to hold the materials together while curing from liquid to solid state, while losing solvent, or during a chemical reaction. Many of the substances designated as adhesives may also be designated as caulking, potting, sealing, casting or encapsulating compounds when employed in a thick mass. In a more restrictive sense, to be termed an adhesive, a substance should be a liquid or a tacky semi-solid, at least for a short period of time to contact and wet a surface, and be used in a relatively thin layer to form a useful joint capable of transmitting stresses from one substrate to another. Thus, the term "adhesives", as used in this specification and in the claims includes cements, glues and pastes.

Solvent cementing is a process in which thermoplastics, usually amorphous, are softened by the application of a suitable solvent or mixture of solvents, and then pressed together to effect a bond. The resin itself, after evaporation of the solvent, acts as the filler. Many thermoplastic substrates are easier to join effectively by solvent cements than by conventional adhesive bonding. Generally, a small amount of the resin to be cemented is dissolved in a solvent to form the cement. The inclusion of the resin aids in gap filling, accelerates setting, and reduces shrinkage and internal stresses.

Solvent cements also have been utilized to bond different plastic materials to each other, but in such instances, the solvent must be a solvent for both plastics. Usually in such instances, a mixture of solvents is used. The solvent softens (dissolves) the surface of the substrate to be bonded, and the surface becomes tacky. At this point, the surfaces are brought into contact with each other, often under pressure, and dried.

For the past twenty-five years, solvent cements have been used for joining ABS (acrylonitrile-butadiene-styrene resin), PVC (polyvinylchloride), and CPVC (chlorinated polyvinylchloride) plastic pipe and fittings. The amount of such plastic pipe used for conveying a variety of liquids is enormous. The major uses are drain, waste, vent, sewer and potable water. Plastic pipe has continued to displace the more traditional materials used for the same purpose such as copper, steel, galvanized metal, cast iron, lead and concrete asbestos pipe. Plastic pipe currently is the material of choice in the home, municipal, and manufacturing industries.

Currently available solvent cements generally have a volatile organic chemicals (VOC, calculated in accordance with ASTM D-2369) of from about 600 to about 850 gms/liter. As a result of this awareness, regulations are being enacted into law by Congress and in the various states for controlling and setting limits for the VOC of paints, coatings and other materials such as solvent cements.

Plastic pipe products including solvent cements, cleaners and primers have now come under newly proposed state regulations. In California, for example, where the first air pollution control regulations were implemented, the California Environmental Quality Act (CEQA) along with the South Coast Air Quality Management District (SCAQMD) and the Bay Area Quality Management District (BAAQMD) have stated that the VOC content of solvent cements must be dramatically reduced by Jan. 1, 1994. Thus, solvent cements as currently formulated for joining plastic pipe cannot be used after Jan. 1, 1993, and unless new solvent cements can be developed which meet the new standards, the use of plastic pipe will become obsolete.

Historically, ASTM specifications were developed and adopted by pipe manufacturers in the early 1970's. Joining materials such as solvent cements were also included, and ASTM specifications were written specifically for these materials. National code organizations such as Uniform Plumbing Code (UPC) and the International Association of Plumbing and Mechanical Officials (IAPMO) adopted ASTM standards which were further adopted and included into state and local plumbing codes for the home, building and construction industries.

In the mid 1970's a third party certification organization, the National Sanitation Foundation International (NSF) became the recognized authority for testing, certifying and listing those manufacturers who voluntarily submit their products to NSF. ASTM tests that apply to plastic pipe products are performed by NSF. The listing book published by the NSF entitles plastic pipe product manufacturers to use the NSF logo or seal on their products. Many local, state and other code bodies have written into their plumbing ordinances that plastic pipe products must bear the NSF seal.

The current ASTM standard which relates to ABS solvent cements is ASTM D-2235 which specifies that the ABS solvent cements will contain a minimum of 15% by weight of ABS resin and the remainder is methyl ethyl ketone (MEK) solvent. To have a useful product, the ABS cement typically utilizes 30% to 35% resin and the remainder is MEK. The purpose of using higher than minimum resin is to produce a product that has a suitable viscosity for application to pipes and fittings. Viscosity is measured in centipoise, and a typical ABS cement will have a viscosity of 1000 to 3000 centipoise.

The ASTM standard for PVC solvent cements is ASTM D-2564. According to this standard, such solvent cements contain a minimum of 10% PVC resin, inert fillers, and the remainder is one or more solvents such as tetrahydrofuran (THF), cyclohexanone (CYH), MEK, and acetone.

ASTM F-493 sets forth the requirements for CPVC solvent cements as containing a minimum of 10% CPVC resin, inert fillers, and the remainder is one or more solvents including THF, CYH, MEK and/or acetone.

All three classes of solvent cement have a high solvent to solids content which is believed to be necessary for a solvent cement to perform satisfactorily. The high solvent content allows for penetration and softening of the pipe outer surface and the surface of the inside of the coupling. Prior to application of the cement, cleaners and/or primers are recommended per ASTM D-2855. Most codes require the use of a cleaner or primer. Rapid evaporation of the solvents is necessary to insure handling strength of freshly solvent cemented pipe and also insuring the final cure. Cure is defined as the stage where most of the solvents applied have evaporated leaving the solvent welded joints fused together so that pressure can be successfully applied.

The need for safer and lower VOC solvent cements which are easy to apply, cost effective, and which cure within a reasonable period of time without the use of heat, pressure, UV light or extraordinary mechanical devices is paramount. The bonding or adhesive properties of the solvent cements must be satisfactory for the intended use whether non-pressure drain, waste or vent (DWV) or pressure systems used in potable water applications.

U.S. Pat. No. 4,687,798 describes and claims a solvent cement for joining polymers comprising from about 10% to 15% of a water-insoluble polymer such as PVC or ABS, and a solvent comprised of ethyl acetate and N-methyl-2-pyrrolidone. The solvent cement may contain a thixotropic agent such as silica. U.S. Pat. No. 4,788,002 claims a similar solvent cement which consists of a solution of a solvent of ethyl acetate and N-methyl-2-pyrrolidone wherein the ethyl acetate ranges from about 3% to about 90% with the balance being N-methyl-2-pyrrolidone.

U.S. Pat. No. 4,098,719 describes polyvinyl chloride solvent weld primer compositions for use in the assembly of polyvinyl chloride pipe and fittings to themselves or to ABS pipe or fittings. The primer consists essentially of an organic solvent containing from about 0.5 to about 2.5 weight percent of an unplasticized polyvinyl chloride resin dissolved in the solvent which is a mixture of tetrahydrofuran and dimethylformamide in a weight ratio of from about 1.64:1 to 1:1.

Solvent cements are also described in U.S. Pat. No. 3,765,983 which are applied with specially-designed applicators. The solvent cements which are described comprise a solution of a PVC, ABS or CPVC in a suitable solvent such as tetrahydrofuran, cyclohexanone, dimethylformamide, or mixtures thereof. The resin in the cement is preferably the same as the resin of the pipe and fittings to be joined.

U.S. Pat. No. 3,770,547 relates to a method for adhesively bonding surfaces which includes the use of adhesives including solvent cements such as volatile solvent solutions of polyvinylchloride, ABS polymers, cellulose acetate, etc., in organic liquid vehicles such as ethanol, methanol, methyl ethyl ketone, acetone, tetrahydrofuran, etc.

U.S. Pat. No. 4,980,383 describes foamable compositions useful in preparing foamed articles. The foamable compositions comprise a chlorinated vinyl resin containing inorganic materials including fibrous materials, a chemical blowing agent and a solvent. The term CPVC is defined in the patent (Col. 5) as including mixtures of chlorinated polyvinyl chloride resin and other resins such as vinyl chloride resin, chlorinated polyethylene, methacrylate-acrylate copolymer, etc.

U.S. Pat. Nos. 3,230,184; 3,873,475; and 4,053,448 relate to polyester resin compositions which contain hollow glass microspheres. The compositions described in the '475 patent are useful as lightweight patching, caulking or sealing compositions, and the '448 patent describes the compositions as being useful patching compositions for repairing imperfections in metal surfaces. The polyester resin molding compositions described in the '184 patent are reported to yield products of substantial strength and lighter weight. The compositions also contain a fibrous filler material in addition to the hollow spheres.

Inorganic filler materials which comprise a mixture of an inorganic powder and inorganic hollow microspheres are reported to be useful in a curable polyester composition in U.S. Pat. No. 5,028,456. The curable composition comprises, in addition to the inorganic filler, at least one unsaturated polyester resin, at least one hydrocarbon monomer copolymerizable with the polyester, and at least one aryl sulfonamide-aldehyde resin. The compositions are useful as plastic body fillers for repairing metal surfaces.

U.S. Pat. No. 5,252,634 describes low volatile organic compounds emitting thermoplastic pipe adhesives which include at least one resin such as PVC, CPVC and acrylics, or ABS, a solvent blend, a low specific gravity filler such as hollow ceramic microspheres, and a thixotropic agent (e.g., silica) for maintaining the homogeneity of the adhesive mixture.

SUMMARY OF THE INVENTION

A method of adhesively bonding or welding a first plastic surface to a second plastic surface is described which comprises the steps of:

(I) applying to the first surface or second surface or both surfaces, a composition which is free of hollow microspheres and comprises a mixture of (A) from about 5% to about 60% by weight of at least one water-insoluble polymer selected from ABS, PVC, CPVC or mixtures thereof;

(B) from about 1% to about 60% by weight of at least one water-insoluble polymer selected from acrylic polymers, vinyl aromatic polymers and vinyl pyrrolidone polymers; and (C) from about 10% up to about 90% by weight of at least one volatile organic liquid which is a solvent for polymers (A) and (B);

(II) contacting the first surface with the second surface; and (III) allowing the adhesive composition to form a bond or weld between the first surface and the second surface.

The invention also relates to compositions which comprise a mixture of (A) from about 5% to about 60% by weight of at least one water-insoluble polymer selected from ABS, PVC, CPVC or mixtures thereof;

(B) from about 1% to about 60% by weight of at least one imide containing acrylic polymer; and (C) from about 10% up to about 90% by weight of at least one volatile organic liquid which is a solvent for polymers (A) and (B).

DESCRIPTION OF THE PREFERRED EMBODIMENTS

In addition to the definitions contained in the Background, the following terms utilized in the present application and claims have the following meanings:

weld—to fuse or join two components together through the use of the adhesive compositions of the present invention;

solvent—a substance capable of dissolving another substance;

volatile solvent—a solvent which evaporates rapidly at room temperature or at a slightly elevated temperature;

solvent welding—a process that utilizes solvents to join two surfaces together;

solvent cement—an adhesive made by dissolving a plastic resin or compound in a suitable solvent or mixture of solvents. The solvent cement dissolves the surfaces of the pipe and fittings to form a bond between the mating surfaces provided the proper cement is used for the particular materials and proper techniques are followed (ASTM 2235);

adhesive (composition)—includes any liquid coating composition which is capable of forming a bond or a weld between two surfaces;

primer—any conventionally employed liquid composition which prepares the surface to be bonded for satisfactory adhesive bonding or welding;

cured—when most of the solvent applied has evaporated leaving a thermoplastic solvent welded joint fused together so that pressure can be successfully applied;

DWV—drain, waste, vent applications.

The invention of this application relates to a method of adhesively bonding or welding a first plastic surface to a second plastic surface and to compositions which are useful in the method. In a first embodiment, the composition useful for adhesively bonding plastic surfaces together is free of hollow microspheres and comprises a mixture of (A) from about 5% to about 60% by weight of at least one water-insoluble polymer selected from ABS, PVC, CPVC or mixtures thereof;

(B) from about 1% to about 60% by weight of at least one water-insoluble polymer selected from acrylic polymers, vinyl aromatic polymers and vinyl pyrrolidone polymers; and (C) from about 10% up to about 90% by weight of at least one volatile organic liquid which is the solvent from polymers (A) and (B).

In a second and presently preferred embodiment, the compositions useful for adhesively bonding or welding plastic surfaces comprises a mixture of (A) from about 5% to about 60% by weight of at least one water-insoluble polymer selected from ABS, PVC, CPVC or mixtures thereof;

(B) from about 1% to about 60% by weight of at least one imide containing acrylic polymer; and (C) from about 10% up to about 90% by weight of at least one volatile organic liquid which is a solvent for polymers (A) and (B).

The composition of the above presently preferred embodiment also may be free of hollow microspheres.

(A) ABS, PVC and CPVC Polymers

The first component of the compositions of the present invention and the compositions which are useful in the method of the present invention is at least one polymer selected from ABS, PVC, CPVC or mixtures thereof. The polymers utilized in the compositions may be freshly prepared polymer, and in some instances may be polymer regrind. The choice of polymer included in the composition generally will depend upon the intended end use of the composition. For example, if the composition is to be used as a cement for bonding ABS surfaces, the polymer used in the composition generally will be ABS. Similarly, if the composition is to be used for bonding PVC or CPVC surfaces, the polymer in the composition will be PVC or CPVC.

The ABS polymer dissolved in the solvent to form the composition of the present invention generally will have a minimum butadiene content of 6%, a minimum acrylonitrile content of 15% and a minimum styrene or substituted styrene content of 15%. In one embodiment, useful ABS resins contain from about 25–45% acrylonitrile, 6–15% butadiene and 40–60% styrene or substituted styrene. Useful ABS polymers are available commercially from General Electric, for example. Blendex ADG-21 is an ABS resin from GE which is approved for use in NSF sanctioned pipe applications, and this resin comprises about 35.4% acrylonitrile, 7.46% butadiene and 56.9% styrene. Its density is 1.02 g/cc. Blendex 200 is another ABS resin from GE which contains about 36.3% acrylonitrile, 9.50% butadiene, and 54.1% styrene. The bulk density of Blendex 200 is 1.03 g/cc.

In another embodiment, the water-insoluble polymer is a vinyl chloride polymer or copolymers including, for example, polyvinyl chloride (PVC) and chlorinated polyvinyl chloride (CPVC). Vinyl chloride polymers and copolymers are well known in the art. Copolymers of vinyl chloride include, for example, copolymers of vinyl chloride with one or more copolymerizable monomers having at least one terminal $CH_2=C<$ group such as other vinyl halides and vinylidene halides; acrylic acid, esters of acrylic acid such as methyl acrylate, ethyl acrylate, etc.; methacrylic acid; esters of methacrylic acid; nitriles such as acrylonitrile, methacrylonitrile, etc.; acrylamides such as methyl acrylamide, etc.; vinyl ethers such as ethyl vinyl ether; vinyl ketones; vinyl acetate; vinyl pyridine; etc. Copolymers of vinyl chloride may contain up to 50%, preferably up to 20% of the copolymerizable monomers. In one embodiment, the inherent viscosity of the PVC polymers and copolymers may range from about 0.30 to 1.5 and more often from about 0.30 to 0.95. PVC homopolymers and copolymers are available from a number of commercial sources. For example, a PVC homopolymer resin is available from Occidental Chemical Corporation under the designation OXY 190 and from B. F. Goodrich under the designation "Geon" such as Geon 110×334. Copolymers are available from Occidental Chemical Corporation under the designation OXY 1415 (16% bound vinyl acetate, inherent viscosity 0.37, and bulk density 0.66 g/cc) and OXY 1515 (13.8% bound vinyl acetate, inherent viscosity 0.47, and bulk density of 0.61).

The chlorinated polyvinyl chlorides (CPVC) useful in the compositions of this invention include chlorinated polyvinyl chloride homopolymers and copolymers. CPVC resins useful in this invention may be prepared by chlorination of any of the polyvinyl chloride homopolymers or copolymers discussed above by procedures known to those skilled in the art. CPVC resins available commercially, are generally available as powders, and may contain from about 57 to about 75% by weight of chlorine. CPVC is often the resin of choice where its high heat deflection resistance is desirable such as in hot water piping systems. CPVC resins useful as the water-insoluble resin in the composition of the invention are available commercially from, for example, B. F. Goodrich under the trade designation Temprite 674×571 and from Kaneka Texas Corporation, Houston, Tex. under such designations as H-305 (63% chlorine), H-408 (64% chlorine), H-526 (65% chlorine), H-827 (68% chlorine), etc.

The compositions useful in the present invention generally will contain at least 5% or 10% up to about 25%, 30% or 60% of the water-insoluble polymers. More often, the compositions will contain from about 5% to about 30% by weight of the water-insoluble polymer mixtures of the polymers. For example, mixtures of PVC and CPVC resins have been found to be useful. The weight ratio of PVC to CPVC in useful mixtures may range from 15:0.1 to 0.1:15. One example of such a mixture comprises 11 parts of PVC and 0.5 part of CPVC.

(B) Acrylic, Vinyl Aromatic and Vinyl Pyrrolidone Polymers

The compositions useful in the present invention also comprise from about 0.1 to about 60% by weight of at least one water-insoluble acrylic and/or vinyl aromatic and/or vinyl pyrrolidone polymer. Generally, the amount of these polymers in the compositions is from about 1-30% by weight or from about 3% to about 20% by weight, or from about 3% to about 15% by weight.

The acrylic polymers useful in the present invention are polymers and copolymers of acrylic esters represented by the general formula $CH_2=C(R^1)C(O)OR^5$ wherein $R^1$ is hydrogen or a lower alkyl group containing from 1 to about 6 carbon atoms, and $R^5$ is a lower alkyl group containing from 1 to about 16 or more carbon atoms. More often, $R^1$ is hydrogen or a methyl or ethyl group and $R^5$ is an alkyl group containing from 1 to about 4 carbon atoms. Examples of such acrylic esters include: methyl acrylate, ethyl acrylate, propyl acrylate, isopropyl acrylate, n-butyl acrylate, sec-butyl acrylate, isobutyl acrylate, hexyl acrylate, heptyl acrylate, 2-heptyl acrylate, 2-ethyl hexyl acrylate, dodecyl acrylate, hexadecyl acrylate, methyl methacrylate, methyl ethacrylate, ethyl methacrylate, ethyl ethacrylate, etc.

Acrylic copolymers also can be prepared by copolymerizing an acrylic ester monomer with other monomers such as other acrylic esters, acrylic acid, methacrylic acid, acrylamide, methacrylamide, acrylonitrile, maleimide and N-substituted maleimides such as N-alkylmaleimide, N-cycloalkylmaleimide and N-arylmaleimide, and styrene. Acrylic copolymers can be obtained by polymerizing two or more of the above-described monomeric acrylic esters by procedures well known to those skilled in the art, and many acrylic copolymers are available commercially. The acrylic polymers and copolymers can be made by free radical polymerization initiated by peroxide or azo catalyst, or by redox polymerization. The basic polymerization processes include bulk polymerization, suspension polymerization, emulsion polymerization and solution polymerization.

Acrylic polymers and copolymers which may included in the compositions useful in the present invention are available from a variety of commercial sources. Many acrylic polymers and copolymers are available from Rohm & Haas Company under various trade designations such as "Paraloid ®", "Acryloid ®", etc. Specific examples of such acrylic polymers and copolymers include Acryloid B-67, Paraloid K-120N, Paraloid KM-390, Paraloid KM-334. Acrylic polymers and copolymers also are available from Kaneka Texas Corp. under such trade designations as FM-10, FM-20 and PA-10. Another group of useful commercial acrylic polymers and copolymers is available from ICI Acrylics, St. Louis, Mo., under the general trade designation "Elvacite Acrylic Resins." For example, Elvacite 2010 is a medium molecular weight polymer of methyl methacrylate; Elvacite 2021 is a high molecular weight polymer of methyl methacrylate; Elvacite 2043 is a low molecular weight polymer of ethyl methacrylate; Elvacite 2044 is a high molecular weight polymer of n-butyl methacrylate; Elvacite 2016 is a low molecular weight copolymer of methyl and n-butyl methacrylates; and Elvacite 2046 is a high molecular weight copolymer of equal parts of n-butyl methacrylate and isobutyl methacrylate.

In one embodiment, the acrylic polymers which are utilized in the compositions of the present invention are imide-containing acrylic polymers. The imide-containing acrylic polymers and copolymers are available commercially and may be prepared by a variety of procedures. Imidized acrylic polymers may be prepared by reacting an acrylic polymer or acrylic copolymer with ammonia or a primary aliphatic or aromatic monoamine. The imide group is formed by the reaction of the monoamine with two or more of the following groups which may be present in the acrylic polymer: carboxylic acid group, carboxylic ester group, carboxamide (e.g., from methacrylamide), etc. Such imidized acrylic polymers and their preparation have been disclosed in various patents and publications, and such polymers have been referred to as glutarimide acrylic copolymers or polyglutarimides in view of the formation of glutarimide groups when the ammonia or primary amine reacts with the acrylate copolymer. Reactions of ammonia and primary aliphatic amines with acrylate polymers are described in, for example, U.S. Pat. No. 4,246,374 to Kopchik and U.S. Pat. No. 4,727,117 to Hallden-Abberton et al, and a procedure utilizing primary aliphatic amines is described in U.S. Pat. No. 3,284,425, which patents are hereby incorporated by reference for their disclosure of the methods of preparing the imidized acrylic polymers useful in the present invention.

The imidized acrylic polymers containing glutarimide groups may be characterized by the formula

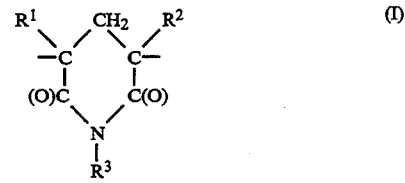

wherein $R^1$, $R^2$ and $R^3$ are each independently hydrogen or lower alkyl, aryl, alkaryl or aralkyl groups. The term "lower alkyl" is utilized in the present application and claims is intended to include alkyl groups containing from 1 to about 6 carbon atoms such as methyl, ethyl, propyl, butyl, amyl, hexyl, and the various isomers thereof. Generally, $R^1$, $R^2$ and $R^3$ are lower alkyl groups and preferably methyl or ethyl groups.

The imidized acrylic polymers useful in the present invention also may be characterized as containing repeating units which are characterized by Formula II

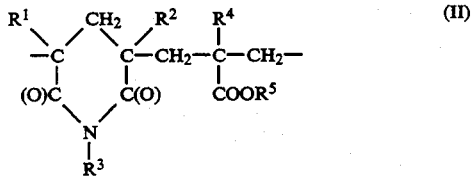

wherein $R^1$, $R^2$, $R^4$ and $R^5$ are each independently hydrogen or lower alkyl groups containing from 1 to about 6 carbon atoms, and $R^3$ is hydrogen or an alkyl, aryl, alkaryl or aralkyl group. In Formula II, $R^1$, $R^2$, $R^3$, $R^4$ and $R^5$ are generally methyl or ethyl groups, preferably methyl groups.

The acrylic polymers which are reacted with the amines to form the imidized acrylic polymers may be any polymer containing units derived from esters of acrylic or methacrylic acid. The polymer can be single or multiple stage, but in the latter case, the outer or final stage must contain units derived from acrylic or methacrylic acid. While any such acrylic or methacrylic acid ester can comprise the acrylic polymer, generally at least 25% by weight, and more often above about 80% by weight of the acrylic polymer is derived from esters of acrylic or methacrylic acid. The acrylic polymer can be of a wide range of molecular weights and can be in any form.

The degree of imidization of the acrylic polymer is readily controlled by the imidization process, and different degrees can be obtained for different properties desired in the final product. As low as 1% imidization can be achieved, and for the purposes of this invention, at least 5% imidization is desirable. About 100% imidization can be achieved by the process described in U.S. Pat. No. 4,246,374, and in such instances, essentially all of the ester (or acid) groups present in the acrylic polymer are converted to imide moieties. Repeating units characterized by Formula II described above are present in the imidized acrylic polymer when there is less than 100% imidization. As will be noted, the repeating units in Formula II contain acrylic ester units of the formula

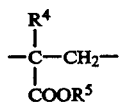

wherein $R^4$ and $R^5$ are each independently hydrogen or a lower alkyl group containing from 1 to about 6 carbon atoms. Examples of imidized acrylic polymers include: poly(methylmethacrylate) with ammonia or methyl amine; a copolymer of methyl methacrylate and ethyl acrylate with ammonia or methyl amine; and a copolymer of methyl styrene and methyl methacrylate with ammonia or methyl amine.

An example of an imidized acrylic polymer, and more particularly, a glutarimide acrylic copolymer which is commercially available is a product designated Paraloid HT-510 from Rohm & Haas Company. This product is reported to be characterized by repeating units of Formula II wherein $R^1$, $R^2$, $R^3$, $R^4$ and $R^5$ are methyl groups. Other polyimide copolymers manufactured and sold by the Rohm & Haas Company include Paraloid EXL-4151, Paraloid EXL-4171, Paraloid EXL-4241 and Paraloid EXL-4261.

Imide-containing acrylic polymers useful in the compositions and methods of the invention may also be prepared by other known techniques. For example, they may be prepared by copolymerization of an alkylacrylate or alkylmethacrylate with maleimide, N-alkylmaleimide, N-cyclohexylmaleimide or N-arylmaleimide, etc.; copolymerization of alkylmethacrylates, maleimide, and/or N-alkyl and/or N-cyclohexyl, and/or N-aryl-maleimides, styrene and/or ring-substituted styrenes or α-methylstyrene; copolymers of styrene, ring-substituted styrenes with maleimide or N-alkyl, or N-cyclohexyl, or N-aryl-maleimides; etc.

In one preferred embodiment, the imide-containing acrylic polymers (B) are acrylic polymers prepared by the polymerization (generally free radical) of alkyl methacrylate with maleimide or substituted maleimides. The copolymers can be prepared having a wide range of molecular weights and with a wide range of acrylate group monomers and a wide range of maleimide group monomers.

The methacrylate group monomers include, for example, methyl methacrylate, ethyl methacrylate, etc. The maleimide group monomers include maleimide, N-methylmaleimide, N-ethylmaleimide, N-phenylmaleimide, N-cyclohexylmaleimide, etc. A third monomer may be present which may contain an acrylate group such as ethyl acrylate, propyl acrylate, butyl acrylate, etc. Copolymers can be prepared from mixtures of the first two monomer groups, mixtures of the second and third monomer groups, and mixtures comprising all three groups of monomers. The imide-containing copolymers useful in the present invention generally will contain 70% or more of the acrylate monomer fraction and up to about 30% by weight of the maleimide monomer fraction. More often the copolymers contain from about 90% to about 99% by weight of the acrylate monomer fraction and from about 1% to about 10% by weight of the imide monomer fraction.

Imide-containing acrylic copolymers such as described above are more fully described in U.S. Pat. No. 5,073,615 which is hereby incorporated by reference for its disclosure of such imide-containing copolymers and their preparation. Such imide-containing copolymers useful in the present invention are available commercially from ICI Acrylics, Inc., St. Louis, Mo., under the general designation Perspex HHA. HHA-8, HHA-15 and HHA-16 are copolymers obtained from a mixture comprising methyl methacrylate and N-cyclohexylmaleimide.

The compositions useful in the present invention may contain (B) at least one polymer of a vinyl aromatic compound. The polymers may be homopolymers, copolymers, terpolymers or graft polymers. The copolymers include polymers of the vinyl aromatic compound and one or more copolymerizable monomers such as unsaturated dicarboxylic acid reagent including the acids, anhydrides, imides, metal salts and partial esters of said acids; acrylic acids and esters; alkyl-substituted acrylic acids and esters; acrylonitriles; dienes such as butadiene; etc. The terpolymers include polymers of the vinyl aromatic compound with two or more monomers including dienes, acrylonitrile, acrylic acids and esters, etc. Preferably the polymer blends of the invention comprise from about 5 to about 25% by weight of the polymer (III), and more often, from about 5% to about 15% by weight.

The vinyl aromatic compounds include styrene and the various substituted styrenes which is represented by the following formula

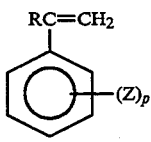

wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyltoluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

Specific examples of homopolymers of vinyl aromatic compounds include polystyrene, poly(alpha-methylstyrene), poly(p-methylstyrene) and high impact polystyrene (HIPS).

The maleic anhydride and maleimide derivative compounds utilized in the formation of the copolymers with vinyl aromatic compounds may generally be represented by the formula

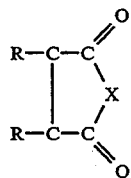

wherein each R group is hydrogen or an aliphatic or aromatic hydrocarbyl group or the two R groups are joined together to form a fused ring derivative, X is —O— or >NR$^2$ where R$^2$ is a hydrocarbyl group which may be an aliphatic or an aromatic hydrocarbyl group such as phenyl, methyl, ethyl, propyl, butyl, etc. Preferably both R groups are hydrogen and X is —O—.

Copolymers comprising a vinyl aromatic compound and metal salts of maleic acid also are useful in the blended polymer compositions of the present invention. The metals present in the metal salt of maleic acid may be Group I metals, Group II metals or transition metals. Alkali metals and transition metals are preferred. Partial esters of the unsaturated anhydrides also can be used. These can be obtained, for example, by reacting or esterifying, maleic acid or maleic anhydride with less than one equivalent of an alcohol such as methanol, ethanol, propanol, etc.

Examples of copolymerizable acrylic acids and esters include: methyl acrylate, ethyl acrylate, butyl acrylate, methyl methacrylate. Other vinyl monomers which can be used to form the copolymers and terpolymers include vinyl acetate, vinyl methyl ether, vinyl ethyl ether, vinyl chloride, isobutene, etc. The vinyl aromatic compounds also can be polymerized with dienes such as butadiene. SBR is a commercially available copolymer of styrene-butadiene.

The copolymers of the vinyl aromatic compounds with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic compound to a temperature at which the vinyl aromatic compound will polymerize, (2) stirring the polymerizing vinyl aromatic compound while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic compound is polymerizing. Procedures for preparing such copolymers are known in the art and have been described in, for example, U.S. Pat. No. 2,971,939.

Styrene-maleic anhydride copolymers (SMA) are available commercially from, for example, ARCO under the general trade designation Dylark. Examples include: Dylark DBK-290 reported to comprise about 18% by weight of maleic anhydride and about 82% by weight of styrene; Dylark 332 reported to comprise about 14% by weight of maleic anhydride and 86% by weight of styrene; and Dylark 134 reported to comprise about 17% by weight of maleic anhydride, the balance being styrene.

Other Dylark materials available include transparent grades: Dylark 132 (Vicat 109° C.), Dylark 232 (Vicat 123° C.), and Dylark 332 (Vicat 130° C.). Impact grades include Dylarks 150,250,350 and 700 which are believed to be blends and/or grafts of SMA with SBR.

Other examples of styrenic and alpha-methyl styrene copolymers with maleic anhydride and acrylonitrile include Arvyl 300 MR and 300 CR.

Other examples of copolymers of vinyl aromatic compounds include: styrene-acrylonitrile (SAN) such as the styrene acrylonitrile copolymer available from Monsanto under the trade designation Lustran 31-2060; styrene-acrylic acid; styrene methacrylic acid; styrene-butadiene such as the styrene butadiene copolymer available from Phillips under the designation K-resin; styrene-isoprene; and the hydrogenated versions of styrene-butadiene and styrene isoprene copolymers. The copolymers may be of the grafted or block types.

The compositions useful in the present invention may contain at least one vinyl pyrrolidone polymer. These polymers may be homopolymers, copolymers, terpolymers or graft polymers. Copolymers include polymers of the vinyl pyrrolidone and one or more copolymerizable monomers such as acrylic acids or esters, vinyl esters, etc. The vinyl pyrrolidone monomer generally is an N-vinyl or 1-vinyl, 2-pyrrolidone monomer. The pyrrolidone ring may contain one or more substituents such as lower alkyl groups. In one embodiment, copolymers of N-vinyl-2-pyrrolidone with an acrylic or vinyl ester preferred. Copolymerizable acrylic esters include methyl acrylate, ethyl acrylate, methylmethacrylate, etc. Copolymerizable vinyl esters include vinyl acetate, vinyl propionate, etc. A preferred vinyl ester is vinyl acetate.

Polymers and copolymers of vinyl pyrrolidone are available commercially such as from G.A.F. Examples of homopolymers include PVP K-60 and PVP K-30. Examples of copolymers include PVP/VA I-735; PVP/VA W-735; PVP/VA E-535; and PVP/VA I-535.

(C) Volatile Organic Liquid Solvent

The compositions of the present invention contain at least about 10% or 20%, or 30% or 50% up to about 60% or 70% or 80% or 85% or 90% by weight of at least one volatile organic liquid which is a solvent for the water-insoluble polymers (A) and (B) contained in the composition. The volatile organic liquid or liquid mixture used as a solvent may be any liquid or liquids which will dissolve the water-insoluble polymers (A) and (B) contained in the adhesive compositions, and when the compositions are to be used as adhesives such as solvent cements, the solvent which also is preferably a solvent for the plastic surface or surfaces which are to be welded or bonded together by the adhesive compositions. In addition, the organic liquids which are used as the solvents must be volatile, that is, it must be capable of vaporizing under a wide variety of application temperature conditions. In one embodiment, a volatile solvent is one which is capable of vaporizing at ambient or at temperatures slightly above ambient temperatures. The solvents should also be selected after consideration of the toxicity effects and biodegradability of the solvents.

Among the solvents which may be included in the compositions of the invention and which have been commonly used alone or in combination for adhesive compositions are lower alcohols such as methanol, ethanol and isopropanol; ketones such as acetone, methyl ethyl ketone (MEK), methyl propyl ketone (MPK), methyl isobutyl ketone, isophorone and cyclohexanone (CYH); esters such as methyl acetate, ethyl acetate, ethyl formate, ethyl propionate, and butyl acetate; halogenated solvents such as methylene chloride, ethylene dichloride, trichloroethylene; ethers such as methyl Cellosolve and dioxane; and other liquids such as tetrahydrofuran (THF), gamma-butyrolactone, N-methyl pyrrolidone (NMP) and dimethylformamide (DMF). As noted earlier the choice of solvent depends upon the type of water-insoluble polymers (A) and (B) and the intended use of the composition. For example, if the composition is to be used as a solvent cement for cementing two plastic surfaces together, the solvent or at least one solvent in a mixture should be capable of dissolving or softening the surface of the plastic. Although any of the above solvents may be used, it has been discovered that the preferred solvents when the compositions of the invention are to be used as solvent cements characterized as having low VOC, the solvents preferably are tetrahydrofuran, methyl ethyl ketone, acetone, cyclohexanone, N-methyl pyrrolidone (NMP), dimethylformamide (DMF), and mixtures thereof, although DMF is no longer a desirable solvent in view of its carcinogenic potential in humans. Particularly useful solvents in the compositions of the present invention when polymer (A) is an ABS polymer are methyl ethyl ketone and acetone. In one embodiment, acetone is preferred since it can be used to prepare adhesive compositions of the present invention characterized by desirable viscosity and low toxicity. Mixtures of tetrahydrofuran (THF) and cyclohexanone and a mixture of THF, CYH, MEK and acetone are useful solvents in adhesive compositions when the water-insoluble polymer (A) is PVC. When the water-insoluble polymer (A) is CPVC, THF or mixtures of THF, CYH, MEK and acetone are useful solvents.

(D) Solid Particulate Inorganic Filler

In addition to the above components, the compositions may and preferably do contain at least one solid particulate inorganic filler. The amount of filler is determined by the end use of the composition. For example, adhesive compositions may contain a small amount whereas sealants will generally contain larger amounts of the filler. Thus, the adhesive compositions of the present invention may be characterized as containing from 0 to about 4% or even up to 5% by weight of at least one solid particulate inorganic filler. The adhesive compositions of the present invention generally will contain at least about 0.1% or 0.75% by weight up to about 1.5% or 3% or 4% by weight of the solid particulate inorganic filler. The particulate inorganic fillers are inert and are generally included in the compositions of the present invention to improve working viscosity and structural strength, and to reduce costs.

The solid particulate inorganic fillers incorporated into the adhesive compositions of the present invention preferably are fine powders having an average particle size of less than about 50 microns and a density of less than about 4 g/cc. The inorganic fillers which can be utilized in the adhesive compositions of the present invention include amorphous silica, silica flour, ground quartz, talc, magnesium silicate, calcium carbonate, clay, whiting, shell flour, wood flour, alumina, antimony trioxide, asbestos powder, barium sulfate, calcined clays, China clays, magnesium oxide, mica powder, fumed silica, etc. A preferred filler is fumed silica available commercially from Cabot Corporation under the trade designation CAB-O-SIL and from the Degussa Corporation under the trade designation Aerosil. For example, CAB-O-SIL grade PTG is a fumed silica available from the Cabot Corporation and having a surface area of $200 \pm 25$ $m^2/g$ and a nominal particle diameter of 0.014 microns.

The compositions useful in the present invention should be thoroughly blended to provide substantially homogeneous mixtures. Substantially homogeneous mixtures are desirable since non-uniform mixtures will result in non-uniform distribution of the adhesive composition and non-uniform adhesion to substrate surfaces. If desired, other components may be advantageously included in the compositions although the compositions of the invention generally are free of hollow microspheres. Other components can include lubricants, stabilizers, plasticizers, colorants, pigments, processing aids, etc. Small amounts of pigments or colorants such as titanium dioxide, carbon black or a dye or other colorant may be added to the adhesive compositions to serve as a guide for uniform mixing and to provide a method of identifying various adhesive compositions. Exemplary stabilizing agents for PVC and CPVC formulations include alkyltin compounds such as methyltin, butyltin and octyltin; dialkyltin dicarboxylates; methyltin mercaptides and butyltin mercaptides; dialkyltin bis(alkylmercaptocarboxylate) including di-n-octyltin-S,S'-bis(isooctyl mercaptoacetate); butylthiostannoic acid; etc. Di-lower alkyl tin stabilizers such as $C_4$ to $C_8$ alkyltin mercaptides are normally preferred. The stabilizers are generally present in amounts of from about 0.05 to 3% by weight.

The adhesive compositions formulated in accordance with the present invention generally have a minimum viscosity of about 200 centipoises (cps), and the viscosity may be as high as 10,000 to 15,000 cps provided that the adhesive compositions can be readily applied to the surfaces to be bonded. The molecular weights of the polymers (A) and (B) affect the viscosity of the adhesive composition. The use of polymers having lower inherent viscosities permits a higher polymer percentage or loading and thereby lower the amount of solvent required to achieve a given viscosity. Viscosities may range from about 200 to about 15,000 cps and are readily obtained with the compositions of the present invention, and such viscosities are desirable since the adhesive may be applied to substrates without dripping and with little or no spillage.

The compositions of the present invention are easy to apply, cost effective, and cure within a reasonable period of time without the use of heat, pressure, UV light or extraordinary mechanical devices. The bonding or adhesive properties are satisfactory for the intended uses whether non pressure drain, waste, vent (DWV), applications or pressure systems used in potable water applications. One particular advantage of the adhesive compositions of the present invention is that the compositions are a one-component system and are "plumber friendly".

The compositions of the present invention are characterized as low VOC compositions particularly when the hollow microspheres are included in the compositions. The use of the compositions of the present invention results in a reduction in organic emissions due to the use of a combination of lower VOC compositions, application methods (less waste), and the non-use of either cleaners or primers to achieve satisfactory results in bonding surfaces such as ABS and PVC pipe and fittings.

In accordance with the present invention, compositions can be prepared having desirable VOC limits by varying the amounts of the components, and in particular, through the use of the acrylic polymers (B) and, when further reduction is desired, hollow microspheres such as the glass bubbles described above. The use of the inorganic hollow microspheres is desirable because they are chemically stable, water-insoluble, non-hazardous (non-toxic), of high strength, and they are compatible with the other ingredients used in the adhesive compositions. In accordance with the present invention, useful compositions can be prepared which may be characterized as low VOC compositions, and more particularly, adhesives characterized by VOC's of less than 500 and even less than 300 grams per liter.

The following examples illustrate the compositions of the present invention. Unless otherwise indicated in the following examples and elsewhere in the specification and claims, all parts and percentages are by weight.

| | |
|---|---|
| Example 1 | |
| ABS resin (Blendex 211) | 15 |
| Acryloid B-67 | 5 |
| MEK | 50 |
| Acetone | 30 |
| Example 2 | |
| PVC resin (Geon 110 × 334) | 11 |
| Acryloid B-67 | 15 |
| THF | 44 |
| MEK | 30 |
| Example 3 | |
| PVC resin (Geon 110 × 334) | 14 |
| Paraloid K120N | 5 |
| THF | 48 |
| MEK | 33 |
| Example 4 | |
| PVC resin (Geon 110 × 334) | 14 |
| Paraloid KM-390 | 5 |
| THF | 48 |
| MEK | 33 |
| Example 5 | |
| PVC resin (Geon 110 × 334) | 13.5 |
| Paraloid HT-510 | 10.0 |
| THF | 45.0 |
| MEK | 31.5 |
| Example 6 | |
| CPVC resin (Temprite 674 × 571) | 18 |
| Paraloid KM-390 | 10 |
| THF | 52 |
| CYH | 20 |
| Example 7 | |
| PVC resin (Vista 5265) | 11.0 |
| CPVC resin (Temprite 674 × 571) | 0.5 |
| Paraloid HT-510 | 13.2 |
| THF | 41.3 |
| MEK | 28.6 |
| CYH | 5.0 |
| Acetone | 0.2 |
| PVC stabilizer | 0.2 |
| Example 8 | |
| PVC resin (Vista 5265) | 11.0 |
| CPVC resin (Temprite 674 × 571) | 0.5 |
| Paraloid HT-510 | 13.7 |
| THF | 41.5 |
| MEK | 27.8 |
| CYH | 4.8 |
| Acetone | 0.2 |
| PVC stabilizer | 0.2 |
| Cabosil fumed silica | 0.3 |
| Example 9 | |
| CPVC resin (Temprite 674 × 571) | 10.7 |
| Paraloid HT-510 | 12.7 |
| THF | 43.7 |
| MEK | 0.2 |
| CYH | 5.0 |
| Acetone | 25.0 |
| PVC stabilizer | 1.0 |
| Fumed silica | 1.2 |
| Orange Pigment Paste | 0.5 |
| Example 10 | |
| PVC resin (Vista 5265) | 10.0 |
| CPVC resin (Temprite 674 × 571) | 0.5 |
| Paraloid HT-510 | 9.4 |
| Acetone | 40.0 |
| NMP | 40.0 |
| PVC stabilizer | 0.1 |
| Example 11 | |
| ABS resin (Blendex 211) | 30 |
| Acryloid B-67 | 10 |
| Methyl ethyl ketone | 57 |
| Talc | 3 |
| Example 12 | |
| PVC resin (Vista 5265) | 10 |
| SAN copolymer (Lustran 31-2060) | 10 |
| Tetrahydrofuran | 50 |
| Methyl ethyl ketone | 30 |
| Example 13 | |
| PVC resin (Vista 5265) | 10 |
| SMA copolymer (Dylark 232-82) | 10 |
| Tetrahydrofuran | 50 |
| Methyl ethyl ketone | 30 |
| Example 14 | |
| PVC resin (Vista 5265) | 8 |
| Styrene-butadiene copolymer (K-resin) | 8 |
| Tetrahydrofuran | 60 |
| Methyl ethyl ketone | 24 |

-continued

| | |
|---|---|
| Example 15 | |
| PVC Resin (Vista 5265) | 10 |
| PVP/VA S-630 | 10 |
| THF | 80 |
| Example 16 | |
| PVC Resin (Vista 5265) | 10 |
| PVP/VA I-735 | 10 |
| THF | 80 |
| Example 17 | |
| PVC Resin (Vista 5265) | 10 |
| PVP/VA I-535 | 10 |
| THF | 80 |
| Example 18 | |
| PVC Resin (Vista 5265) | 10 |
| PVP/VA E-535 | 10 |
| THF | 80 |
| Example 19 | |
| PVC Resin (Vista 5265) | 10.6 |
| HHA 15 | 12.7 |
| THF | 42.5 |
| MEK | 29.0 |
| CYH | 5.0 |
| Acetone | 0.2 |
| Example 20 | |
| PVC Resin (Vista 5265) | 10.6 |
| HHA 15 | 12.7 |
| THF | 42.0 |
| THF | 28.9 |
| MEK | 5.0 |
| CYH | 0.2 |
| Fumed Silica | 0.6 |
| Example 21 | |
| PVC Resin (Vista 5265) | 10.6 |
| HHA 8 | 12.7 |
| THF | 42.5 |
| MEK | 29.0 |
| CYH | 5.0 |
| Acetone | 0.2 |
| Example 22 | |
| PVC Resin (Vista 5265) | 10.6 |
| HHA 8 | 12.7 |
| THF | 42.0 |
| MEK | 28.9 |
| CYK | 5.0 |
| Acetone | 0.2 |
| Fumed Silica | 0.6 |

The compositions described above and illustrated in the above examples are useful in a variety of applications including use as adhesives, cements (including solvent cements), glues or pastes for holding together materials by surface attachment, and as sealants which are load-bearing elastic joining and insulating materials. The compositions are particularly useful as adhesives for bonding or welding two or more plastic surfaces together. In particular, the compositions are useful for bonding or welding a first plastic surface to a second plastic surface, and the method comprises the steps of (I) applying to the first surface or second surface or both surfaces, a composition which is free of hollow microspheres and comprises a mixture of (A) from about 5% to about 60% by weight of at least one water-insoluble polymer selected from ABS, PVC, CPVC or mixtures thereof;

(B) from about 1% to about 60% by weight of at least one water-insoluble acrylic copolymer; and (C) from about 10% up to about 90% by weight of at least one volatile organic liquid which is a solvent for polymers (A) and (B);

(II) contacting the first surface with the second surface; and (III) allowing the adhesive composition to form a bond or weld between the first surface and the second surface.

The composition may be applied to the first surface or the second surface or both surfaces of the plastic material by techniques well known to those skilled in the art. For example, the adhesive may be applied using the standard Dauber which is included with the can of cement in accordance with current practice. The amount of the composition applied to the surface is a minimum amount which will effect the desired bonding or welding when the two plastic surfaces are brought into contact.

Prior to the application of the compositions of this invention to the plastic surfaces, the surface may be cleaned and/or primed to prepare the surface for accepting the adhesive compositions of the invention and improving the bond between the adhesive and the plastic surface. All plastic surfaces to be joined should be cleaned using a chemical cleaner which contains one or more volatile organic liquids, preferably liquids that are solvents for the plastic. The cleaner is designed to remove dirt, grease, oils, glass and any other materials left on the plastic surface from the manufacturing process such as waxes and lubricants.

Primers are solvent systems containing one or more solvents capable of penetrating and dissolving the plastic faster than the adhesive composition. The more aggressive primers show an ASTM designation of F-656 on the label whereas the less aggressive primers may show "Primer/Cleaner" on the label. Primers should be used wherever code bodies have determined that primers are necessary to ensure satisfactory leak-proof joints such as, for example, on schedule 80 pipe. Primers and cleaners may be applied with any type of applicator.

The plastic surfaces which may joined with the compositions in an accordance with the method of the present invention include ABS, PVC and CPVC plastic surfaces including in particular plastic pipes and fittings. When pipes are to be joined using fittings, the adhesive composition may be applied to the inner surface of the plastic fitting or the outer surface of the plastic pipe, or the adhesive may be applied to both the inner surface of the fitting and the outer surface of the pipe, and the fitting is then applied over the end of the pipe. Upon drying under ambient conditions, a strong bond or weld is formed between the pipe and the fitting.

As a general rule, the water-insoluble resin (A) present in the composition will be of the same type as the plastic surface to be bonded or welded. That is, when ABS pipe and fittings are to be joined, the adhesive composition utilized preferably contains ABS resin rather than PVC or CPVC resin. When the plastic surface such as a pipe or fitting comprises PVC, the resin contained in the adhesive composition is PVC or mixtures of PVC and CPVC. Similarly, when the plastic surfaces to be joined comprise CPVC resin, the adhesive composition generally contains CPVC or mixtures of CPVC and PVC.

The utility of the method and the compositions described herein as solvent cements for PVC pipes and fittings is demonstrated by testing the composition of Examples 2-5, 13 and 18-21 for joining PVC to PVC parts per ASTM D-2564. The lap shear strengths after 2 hours (all examples) and after 16 hours (Examples 2-5, 13 and 14) were determined and the results are summarized in the following table. Hydrostatic Quick Burst Strength Tests also were conducted (Examples 2–5) in accordance with ASTM D-2564, and these results also are summarized in the following Table I.

TABLE I

| Composition Example | Lap Shear (psi) After 2 hrs | Lap Shear (psi) After 16 hrs | Hydrostatic Burst (psi) |
|---|---|---|---|
| 2 | 143 | 380 | 400 |
| 3 | 316 | 717 | 605 |
| 4 | 318 | 678 | 560 |
| 5 | 425 | 932 | 690 |
| 12 | 107 | 561 | NR |
| 13 | 101 | 545 | NR |
| 15 | 237 | NR | NR |
| 16 | 234 | NR | NR |
| 17 | 234 | NR | NR |
| 18 | 231 | NR | NR |
| 19 | 430 | 780 | NR |
| 20 | 421 | 787 | NR |
| 21 | 433 | 789 | NR |
| 22 | 419 | 807 | NR |
| 23 | 451 | 815 | NR |

NR = Not run.

The VOC of the compositions of Examples 15–23 also were determined and the results are summarized in the following Table II. For comparison, a 10% PVC solution in THF without any PVP/VA copolymer is also prepared and examined.

TABLE II

| Composition Example | VOC/g/l |
|---|---|
| Control | 495 |
| 15 | 401 |
| 16 | 457 |
| 17 | 277 |
| 18 | 456 |
| 19 | 400 |
| 20 | 410 |
| 21 | 405 |
| 22 | 399 |
| 23 | 409 |

The above results demonstrate the low VOC characteristics of the composition of the invention.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method of adhesively bonding or welding a first plastic surface to a second plastic surface which comprises the steps of:
   (I) applying to the first surface or second surface or both surfaces, a composition which is free of hollow microspheres and comprises a mixture of
   (A) from about 5% to about 60% by weight of at least one water-insoluble polymer selected from ABS, PVC, CPVC or mixtures thereof;
   (B) from about 1% to about 60% by weight of at least one additional water-insoluble polymer selected from imide-containing acrylic polymers, copolymers of styrene-butadiene, styrene-maleic anhydride and styrene-acrylonitrile, and vinyl pyrrolidone polymers; and
   (C) from about 10% up to about 90% by weight of at least one volatile organic liquid which is a solvent for polymers (A) and (B);
   (II) contacting the first surface with the second surface; and
   (III) allowing the adhesive composition to form a bond or weld between the first surface and the second surface.

2. The method of claim 1 wherein the first and second plastic surfaces are PVC or CPVC surfaces.

3. The method of claim 1 wherein the first surface is an inner surface of a plastic fitting, and the second surface is the outer surface of a plastic pipe.

4. The method of claim 3 wherein the plastic fitting and plastic pipe comprise ABS, PVC or CPVC.

5. The method of claim 1 wherein polymer (A) is CPVC.

6. The method of claim 1 wherein the polymer (B) is an imide-containing acrylic polymer.

7. The method of claim 1 wherein the polymer (B) is at least one imidized acrylic copolymer containing at least about 5% by weight of glutarimide groups.

8. The method of claim 7 wherein the glutarimide groups present in copolymer (B) are characterized by the formula

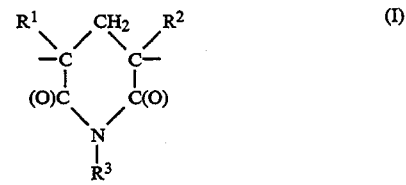

wherein $R^1$, $R^2$ and $R^3$ are each independently hydrogen or lower alkyl, aryl, alkaryl or aralkyl groups.

9. The method of claim 8 wherein $R^1$ and $R^2$ are methyl groups and $R^3$ is an alkyl group containing from 1 to about 4 carbon atoms.

10. The method of claim 9 wherein $R^3$ is a methyl group.

11. The method of claim 7 wherein the acrylic polymer (B) contains repeating units characterized by the formula

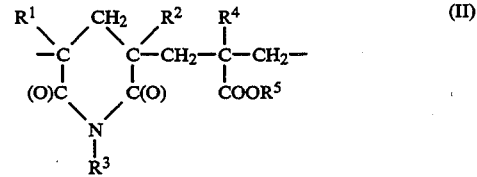

wherein $R^1$, $R^2$, $R^4$ and $R^5$ are each independently hydrogen or lower alkyl groups containing from 1 to about 6 carbon atoms, and $R^3$ is hydrogen or an alkyl, aryl, alkaryl or aralkyl group.

12. The method of claim 10 wherein $R^3$ is an alkyl group containing from 1 to about 4 carbon atoms.

13. The method of claim 6 wherein the imide-containing acrylic polymer is a copolymer of an alkyl acrylate or alkyl methacrylate and an imide selected from the group consisting of maleimide, N-alkylmaleimide, N-cycloalkylmaleimide, and N-arylmaleimide.

14. The method of claim 13 wherein the acrylic polymer is a copolymer of methyl methacrylate and N-cyclohexylmaleimide.

15. The method of claim 1 wherein polymer (B) is a styrene-maleic anhydride copolymer.

16. The method of claim 1 wherein polymer (B) is a styrene-acrylonitrile copolymer.

17. The method of claim 1 wherein polymer (B) is a styrene-butadiene copolymer.

18. The method of claim 1 wherein polymer (B) is an N-vinyl-2-pyrrolidone-vinyl ester copolymer.

19. The method of claim 1 wherein the composition (I) contains from about 5% to about 30% by weight of polymer (A) and from about 1% to about 30% by weight of polymer (B).

20. The method of claim 1 wherein volatile organic liquid (C) comprises methyl ethyl ketone, acetone, tetrahydrofuran, cyclohexanone or mixtures of two or more thereof.

21. The method of claim 1 wherein composition (I) also contains
 (D) from about 0.1% to about 5% by weight of at least one solid particulate inorganic filler.

22. The method of claim 21 wherein the filler (D) is fumed silica.

23. A method of adhesively bonding or welding a first plastic surface to a second plastic surface wherein the first and second plastic surfaces comprise PVC or CPVC which comprises the steps of
 (I) applying to the first surface or second surface or both surfaces, a composition which is free of hollow microspheres and comprises a mixture of
  (A) from about 5% to about 30% by weight of at least one water-insoluble polymer selected from PVC, CPVC or mixtures thereof;
  (B) from about 1% to about 30% by weight of at least one imide-containing acrylic polymer; and
  (C) from about 10% up to about 90% by weight of at least one volatile organic liquid which is a solvent copolymer (A) and (B);
 (II) contacting the first surface with the second surface; and
 (III) allowing the adhesive composition to form a bond or weld between the first surface and the second surface.

24. The method of claim 23 wherein the first surface is an inner surface of a plastic fitting, and the second surface is the outer surface of a plastic pipe.

25. The method of claim 23 wherein the composition (I) comprises from about 5% to about 25% by weight of PVC or CPVC resin and from about 3% to about 15% by weight of at least one imide-containing acrylic polymer (B).

26. The method of claim 23 wherein the composition (I) comprises from about 50% to about 85% by weight of the organic liquid (C).

27. The method of claim 23 wherein the imide-containing acrylic polymer (B) contains at least about 5% by weight of glutaramide groups.

28. The method of claim 23 wherein the imide-containing acrylic polymer (B) is characterized by the formula

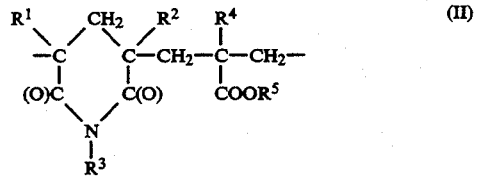

(II)

wherein $R^1$, $R^2$, $R^4$ and $R^5$ are each independently hydrogen or alkyl groups containing from 1 to about 6 carbon atoms, and $R^3$ is hydrogen or an alkyl, aryl, alkaryl or aralkyl group.

29. The method of claim 28 wherein $R^1$, $R^2$, $R^3$, $R^4$ and $R^5$ are methyl groups.

30. The method of claim 23 wherein the imide-containing acrylic polymer (B) is a copolymer of an alkyl acrylate or alkyl methacrylate and an imide selected from the group consisting of maleimide, N-alkylmaleimide, N-cycloalkylmaleimide and N-arylmaleimide.

31. The method of claim 30 wherein the acrylic polymer (B) is a copolymer of methyl methacrylate and N-cyclohexylmaleimide.

32. The method of claim 23 wherein the organic liquid (C) comprises methyl ethyl ketone, acetone, methyl propyl ketone, butyrolactone, tetrahydrofuran, cyclohexanone, N-methyl pyrrolidone or mixtures thereof.

33. The method of claim 23 wherein composition (I) also contains
 (D) from about 0.1% to about 5% by weight of at least one solid particulate inorganic filler.

34. A composition comprising a mixture of
 (A) from about 5% to about 60% by weight of at least one water-insoluble polymer selected from ABS, PVC, CPVC or mixtures thereof;
 (B) from about 1% to about 60% by weight of at least one imidized acrylic polymer containing at least about 5% by weight of glutarimide groups; and
 (C) from about 10% up to about 90% by weight of at least one volatile organic liquid which is a solvent for polymers (A) and (B).

35. The composition of claim 34 containing from about 5% to about 30% by weight of polymer (A) and from about 1% to about 30% by weight of polymer (B).

36. The composition of claim 34 wherein (A) is PVC or CPVC, or a mixture thereof.

37. The composition of claim 34 wherein the glutarimide groups present in copolymer (B) are characterized by the formula

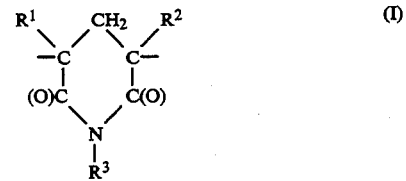

(I)

wherein $R^1$, $R^2$ and $R^3$ are each independently hydrogen or lower alkyl, aryl, alkaryl or aralkyl groups.

38. The composition of claim 37 wherein $R^1$ and $R^2$ are methyl groups and $R^3$ is an alkyl group containing from 1 to about 4 carbon atoms.

39. The composition of claim 38 wherein $R^3$ is a methyl group.

40. The composition of claim 34 also containing
 (D) from about 0.1% to about 5% by weight of at least one solid particulate inorganic filler.

41. A composition comprising a mixture of
 (A) from about 5% to about 60% by weight of at least one water-insoluble polymer selected from ABS, PVC, CPVC or mixtures thereof;
 (B) from about 1% to about 60% by weight of at least one imide-containing acrylic polymer which is a copolymer of an acrylic or methacrylic ester and an imide compound selected from maleimide, N- alkylmaleimide, N-cycloalkylmaleimide, N-arylmaleimide, or a mixture thereof; and (C) from about 10% up to about 90% by weight of at least one volatile organic liquid which is a solvent for polymers (A) and (B).

42. The composition of claim 41 comprising from about 5% to about 30% by weight of polymer (A) and from about 1% to about 30% by weight of polymer (B).

43. The composition of claim 41 wherein the polymer (B) is a copolymer of methylmethacrylate and N-cyclohexylmaleimide.

44. The composition of claim 41 also containing (D) from about 0.1% to about 5% by weight of at least one solid inorganic particulate filler.

45. A method of adhesively bonding or welding a first plastic surface to a second plastic surface which comprises the steps of:

(I) applying to the first surface or second surface or both surfaces, a composition which is free of hollow microspheres and comprises a mixture of (A) from about 5% to about 60% by weight of water-insoluble CPVC;

(B) from about 1% to about 60% by weight of at least one additional water-insoluble polymer selected from acrylic polymers, vinyl aromatic polymers and vinyl pyrrolidone polymers; and (C) from about 10% up to about 90% by weight of at least one volatile organic liquid which is a solvent for polymers (A) and (B);

(II) contacting the first surface with the second surface; and (III) allowing the adhesive composition to form a bond or weld between the first surface and the second surface.

46. The method of claim 45 wherein the polymer (B) is an acrylic polymer.

* * * * *